(12) United States Patent
Lee

(10) Patent No.: US 11,540,245 B2
(45) Date of Patent: Dec. 27, 2022

(54) HOME APPLIANCE AND MOBILE TERMINAL HAVING APPLICATION FOR REGISTERING THE HOME APPLIANCE TO SERVER

(71) Applicant: LG Electronics Inc., Seoul (KR)

(72) Inventor: Suhwan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

(21) Appl. No.: 17/010,336

(22) Filed: Sep. 2, 2020

(65) Prior Publication Data

US 2021/0068068 A1 Mar. 4, 2021

(30) Foreign Application Priority Data

Sep. 2, 2019 (KR) .......................... 10-2019-0108168

(51) Int. Cl.
| | |
|---|---|
| *H04W 60/04* | (2009.01) |
| *H04W 88/18* | (2009.01) |
| *H04W 76/11* | (2018.01) |
| *G16Y 10/80* | (2020.01) |
| *H04W 84/12* | (2009.01) |
| *H04W 88/08* | (2009.01) |
| *H04W 88/12* | (2009.01) |

(52) U.S. Cl.
CPC ............. *H04W 60/04* (2013.01); *G16Y 10/80* (2020.01); *H04W 76/11* (2018.02); *H04W 84/12* (2013.01); *H04W 88/08* (2013.01); *H04W 88/12* (2013.01)

(58) Field of Classification Search
CPC ..... H04W 60/04; H04W 76/11; H04W 84/12; H04W 88/08; H04W 88/12; G16Y 10/80
See application file for complete search history.

(56) References Cited

U.S. PATENT DOCUMENTS

| | | | |
|---|---|---|---|
| 2013/0210379 A1* | 8/2013 | Cloutier | H04W 84/105 |
| | | | 455/411 |
| 2014/0187167 A1* | 7/2014 | Gupta | H04W 48/20 |
| | | | 455/41.3 |
| 2016/0073259 A1 | 3/2016 | Lee et al. | |
| 2019/0230079 A1* | 7/2019 | Chung | H04L 63/18 |
| 2019/0259374 A1 | 8/2019 | Kwon et al. | |
| 2019/0296932 A1 | 9/2019 | Jang et al. | |
| 2020/0184952 A1 | 6/2020 | Kwon et al. | |
| 2020/0275273 A1* | 8/2020 | Smith | H04W 8/005 |

FOREIGN PATENT DOCUMENTS

| | | |
|---|---|---|
| EP | 2993832 | 3/2016 |
| KR | 1020140081270 | 7/2014 |
| KR | 101980039 | 5/2019 |

OTHER PUBLICATIONS

EP Extended European Search Report in European Appln. No. 20193852.9, dated Jan. 28, 2021, 7 pages.

* cited by examiner

*Primary Examiner* — Brian P Cox

(74) *Attorney, Agent, or Firm* — Fish & Richardson P.C.

(57) ABSTRACT

A home appliance configured to be registered in a server, the home appliance includes: a wireless fidelity (Wi-Fi) module, based on the home appliance being registered in the server, communicatively connected to an access point (AP) and configured to periodically operate in an AP mode through a virtual interface, and a controller configured to control the Wi-Fi module to periodically operate in the AP mode. The Wi-Fi module is configured to generate a beacon signal to search for an unregistered home appliance based on the Wi-Fi module being operated in the AP mode.

8 Claims, 15 Drawing Sheets ated USPatent

HOME APPLIANCE AND MOBILE TERMINAL HAVING APPLICATION FOR REGISTERING THE HOME APPLIANCE TO SERVER

CROSS-REFERENCE TO RELATED APPLICATION

This application claims priority to and the benefit of Korean Patent Application No. 10-2019-0108168, filed on Sep. 2, 2019, the disclosure of which is incorporated herein by reference in its entirety.

TECHNICAL FIELD

The present disclosure relates to a home appliance and a mobile terminal including an application for registering the home appliance in a server, and a pre-registered home appliance registering an unregistered home appliance in the server and a mobile terminal including an application registering the unregistered home appliance in the server.

BACKGROUND

With the popularization of mobile terminals such as smart phones and development of Internet of Things (IoT) technology, home appliances performing communication may be used increasingly.

Home appliances may be connected to a server or a mobile terminal through an access point (AP) such as a router at home to perform the communication function. In addition, users may easily determine a state of the home appliance using the mobile terminal and may also remotely control an operation of the home appliance. Furthermore, the users may easily perform product registration of the home appliance using the mobile terminal.

Conventional systems may disclose a mobile terminal, a communication device capable of receiving remote control information and power information of a home appliance, and an operation method thereof. For example, the mobile terminal connects to the communication device based on network identifier information received from the communication device, receives product information of the home appliance from the communication device, and then transmits the received product information to a server, to easily perform the product registration of the home appliance. By way of further example, the mobile terminal may scan an AP device connected to the communication device among neighboring AP devices to remotely control the home appliance and the users may accurately input network information (e.g., a password) of the AP device connected to the communication device.

The home appliance may be registered through the above method, which causes a lot of battery consumption of the mobile terminal due to the scan operation performed on the AP device. The product registration may fail if the users incorrectly input the network information (e.g., the password) of the AP device.

SUMMARY

The present disclosure is directed to a home appliance and a mobile terminal. An operation of searching for an unregistered home appliance is performed by a pre-registered home appliance, not by a mobile terminal.

The present disclosure also is directed to a home appliance and a mobile terminal to transmit, to an unregistered home appliance, network information that has already been used when registering a pre-registered home appliance through communication between home appliances, without additional user input.

According to one aspect of the subject matter described in this application, a home appliance configured to be registered in a server includes a wireless fidelity (Wi-Fi) module, based on the home appliance being registered in the server, communicatively connected to an access point (AP) and configured to periodically operate in an AP mode through a virtual interface, and a controller configured to control the Wi-Fi module to periodically operate in the AP mode. The Wi-Fi module may be configured to generate a beacon signal to search for an unregistered home appliance based on the Wi-Fi module being operated in the AP mode.

Implementations according to this aspect may include one or more of the following features. For example, the Wi-Fi module may be configured to use a hidden service set identifier (SSID) based on the Wi-Fi module being operated in the AP mode, and the controller may be configured to control, based on the virtual interface receiving a communication connection request from an unregistered home appliance that recognized the hidden SSID, the Wi-Fi module to be communicatively connected to the unregistered home appliance that recognized the hidden SSID.

In some examples, the controller may be configured to control, based on the Wi-Fi module receiving a push signal from the communicatively-connected unregistered home appliance, the Wi-Fi module to transmit the push signal to the server through the AP. In some examples, the controller may be configured to control, based on the Wi-Fi module receiving a registration confirmation request for the communicatively-connected unregistered home appliance from the server through the AP, the Wi-Fi module to transmit the registration confirmation request to the communicatively-connected unregistered home appliance.

In some implementations, the Wi-Fi module may be configured to receive AP information from the AP, and the controller may be configured to obtain the AP information, and control, based on the Wi-Fi module receiving a registration confirmation key input completion signal from the communicatively-connected unregistered home appliance, the Wi-Fi module to (i) transmit the obtained AP information to the communicatively-connected unregistered home appliance and (ii) transmit the registration confirmation key input completion signal to the server through the AP. In some examples, the AP information comprises a SSID and a password of the AP.

According to another aspect of the subject matter described in this application, a home appliance configured to be registered in a server includes a Wi-Fi module having a virtual interface, and a controller configured, based on the home appliance not being registered in a server, to control the Wi-Fi module to search for a registered home appliance transmitting a beacon signal and determine whether a hidden SSID included in the beacon signal of the searched registered home appliance matches a preset hidden SSID stored in a list.

Implementations according to this aspect may include one or more following features. For example, the controller may be configured to control, based on the controller determined that the hidden SSID of the searched registered home appliance matches the preset hidden SSID stored in the list, the Wi-Fi module to attempt communication connection to the searched registered home appliance.

In some implementations, the controller may be configured to control, based on the Wi-Fi module being communicatively connected to the searched registered home appliance, the Wi-Fi module to transmit a push signal to the communicatively-connected registered home appliance. In some examples, the controller may be configured to control, based on the Wi-Fi module receiving a registration confirmation request from the communicatively-connected registered home appliance and a registration confirmation key input being determined from a user, the Wi-Fi module to transmit a registration confirmation key input completion signal to the registered home appliance. In some examples, the controller may be configured to control, based on the Wi-Fi module receiving information regarding AP connected to the registered home appliance from the communicatively-connected registered home appliance after transmitting the registration confirmation key input completion signal to the registered home appliance, the Wi-Fi module to attempt the connection with the AP through the virtual interface based on the received AP information.

In some implementations, the controller may be configured to control, based on successful communication connection between the AP and the Wi-Fi, the Wi-Fi module to transmit, to the server and through the AP, registration information comprising unique information of the home appliance. In some examples, the AP information may include an SSID and a password of the AP and the unique information of the home appliance may include a serial number of the home appliance.

According to another aspect of the subject matter described in this application, a mobile terminal includes a wireless communicator comprising a Wi-Fi module communicatively connected to a server, a display unit configured to display an image and receive a touch input from a user, and a controller. The controller may be configured to control, based on the Wi-Fi module receiving a push signal of an unregistered home appliance, the Wi-Fi module to transmit a registration confirmation request for the unregistered home appliance to the server based on the received push signal, and control the image displayed on the display unit to receive the touch input.

Implementations according to this aspect may include one or more following features. For example, wherein the controller may be configured to control the display unit to display a connection selection screen of the unregistered home appliance based on the push signal of the unregistered home appliance, control the display unit to receive a connection selection input of the unregistered home appliance within a predetermined time period based on the connection selection screen, control the Wi-Fi module to transmit the registration confirmation request for the unregistered home appliance to the server based on the received connection selection input, and control the display unit to display a registration confirmation key input guide screen of the unregistered home appliance.

In some examples, the controller may be configured to control the display unit to display, based on the display unit being failed to receive the connection selection input for the unregistered home appliance within the predetermined time period, a connectable unregistered home appliance list selection screen comprising the unregistered home appliance, receive the connection selection input for the unregistered home appliance based on the connectable unregistered home appliance list screen, and display an existing product registration guide screen or a re-registration guide screen for the unregistered home appliance based on the received connection selection input.

In some implementations, the controller may be configured to control, based on the Wi-Fi module not receiving a signal related to a success or failure of the registration of the unregistered home appliance after receiving a registration confirmation key input completion signal from the server, the display unit to display a registration progress screen of the unregistered home appliance. In some examples, the controller may be configured to control, based on the Wi-Fi module receiving a registration failure signal of the unregistered home appliance from the server, the display unit to display a screen comprising a reason for the registration failure of the unregistered home appliance based on the registration failure signal. In some examples, the controller may be configured to control, based on the display unit receiving a registration retry selection input for the unregistered home appliance according to the screen comprising the reason for registration failure, the display unit to display an existing product registration guide screen based on the received registration retry selection input.

In some implementations, the controller may be configured to control, based on the Wi-Fi module receiving a registration completion signal of the unregistered home appliance from the server, the display unit to display a registration completion message of the unregistered home appliance.

DETAILED DESCRIPTION

Figure 1:
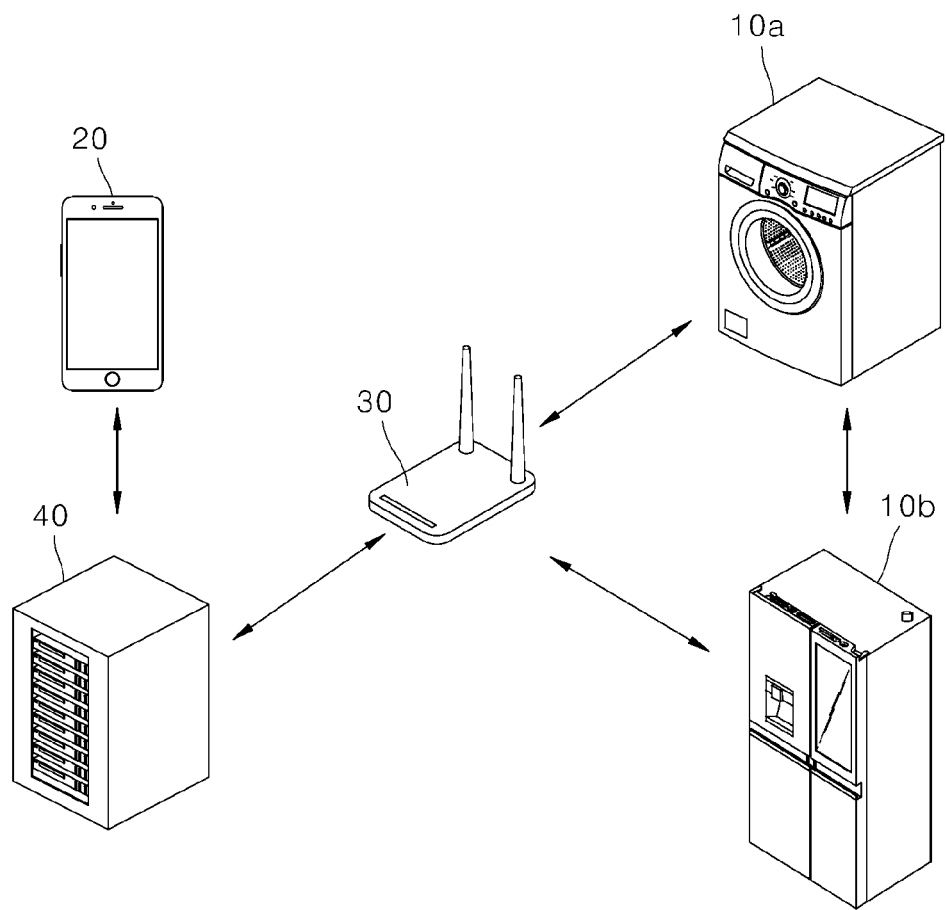
FIG. 1 is a conceptual diagram depicting an example home appliance control system providing a home appliance control service.

FIG. 1 is a conceptual diagram depicting an example home appliance control system providing a home appliance control service.

Referring to FIG. 1, the home appliance control system may refer to a control system to provide a service for remotely controlling home appliances 10a and 10b at home using a mobile terminal 20.

The home appliance control system may include at least one home appliance 10a and 10b, a mobile terminal 20, an access point (AP) 30, and a server 40.

The at least one home appliance (10a, 10b; collectively 10) is installed in a space such as a home to perform various operations. FIG. 1 shows examples of home appliances 10a and 10b, e.g., a washing machine 10a and a refrigerator 10b, but types and a number of home appliances are not limited thereto.

For example, a first one of the home appliances 10a and 10b shown in FIG. 1 may be an unregistered home appliance 10a and a second one thereof may be a pre-registered home appliance 10b. The unregistered home appliance 10a is not registered in the server 40 and the pre-registered home appliance 10b is previously registered in the server 40.

The user may move while carrying the mobile terminal 20, such as a smart phone, a tablet personal computer (PC), a smart watch, and smart glasses.

In some examples, according to some implementations, the home appliance control system may include a fixed terminal such as the PC as well as the mobile terminal.

An application for using a service provided by a home appliance control system may be installed in the mobile terminal 20. The user may remotely control the operations of the home appliances 10a and 10b at home or remotely determine a state of each of the home appliances 10a and 10b through the application installed in the mobile terminal 20.

In some examples, the user may register the home appliances 10a and 10b in the server 40 to use the service provided by the home appliance control system. In this case, the user may register the home appliances 10a and 10b in the server 40 using the mobile terminal 20. The usage of the mobile terminal 20 to register the home appliances 10a and 10b will described below with respect to FIGS. 6 to 15.

The AP 30 may be communicatively connected to each of the home appliances 10a and 10b and the server 40. The each of the home appliances 10a and 10b may communicate with the server 40 through the AP 30. For example, each of the AP 30 and the home appliances 10a and 10b may include a Wi-Fi module to support Wi-Fi wireless communication, and the AP 30 and the home appliances 10a and 10b are connected through the Wi-Fi wireless communication.

Examples of AP 30 may include a router provided at home. Hereinafter, to prevent confusion with the term "an AP mode of a Wi-Fi module of the pre-registered home appliance 10b" described below, the AP 30 is referred to as "a user AP 30" in the present disclosure.

The server 40 provides a home appliance control service and may be managed by a manufacturer or a service provider. The server 40 may store user information regarding user using the service. For example, the user information may include user account information, terminal information, user AP information, registered home appliance information, and any information associated with the user.

The server 40 may receive a control command for a specific home appliance (e.g., the refrigerator 10b) from the mobile terminal 20 and may transmit the received control command to the refrigerator 10b through the user AP 30. In this case, the refrigerator 10b may operate based on the received control command.

Hereinafter, exemplary control components of each of the home appliances 10a, 10b, and the mobile terminal 20 are described with respect to FIGS. 2 to 4.

Figure 2:
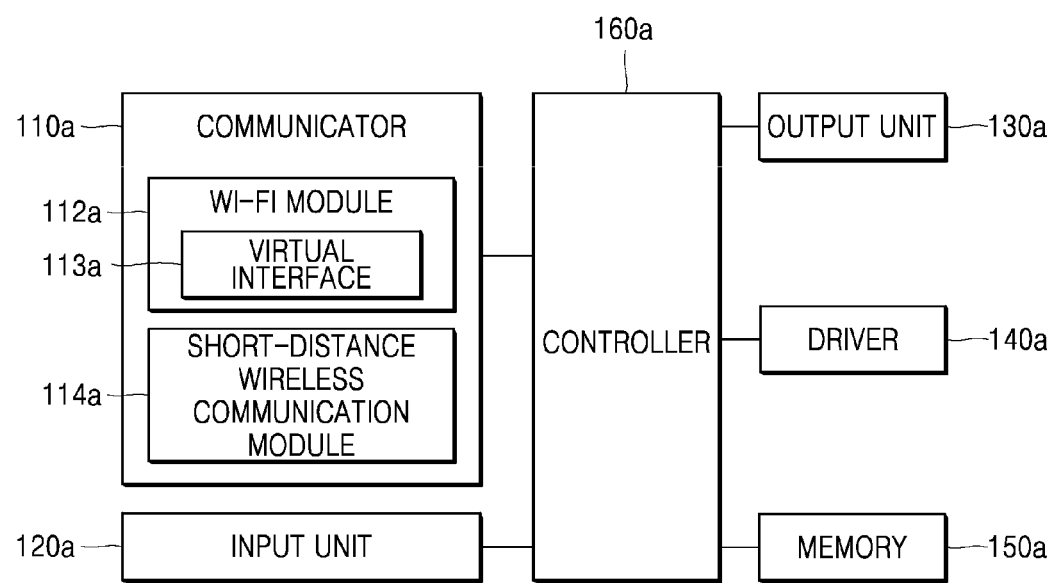
FIG. 2 is an exemplary block diagram depicting the unregistered home appliance of FIG. 1.

FIG. 2 is an exemplary block diagram depicting the unregistered home appliance in FIG. 1.

Referring to FIG. 2, an unregistered home appliance 10a may include a communicator 110a, an input unit 120a, an output unit 130a, a driver 140a, a memory 150a, and a controller 160a. The components of the unregistered home appliance 10a depicted in FIG. 2 may be further included or excluded depending on the type of the unregistered home appliance 10a.

The communicator 110a may include at least one communication module to establish a communication connection between the unregistered home appliance 10a and the user AP 30 or a pre-registered home appliance 10b. For example, the communicator 110a may include a Wi-Fi module 112a to support Wi-Fi wireless communication and a short-range communication module 114a such as Bluetooth and near field communication (NFC).

The Wi-Fi module 112a may operate in at least one of an access point (AP) mode or a station mode, under the control of a microcomputer of at least one of the controller 160a or the Wi-Fi module 112a.

The AP mode may be a mode in which a communication connection between an unregistered home appliance 10a and other peripheral devices is established by connecting other peripheral devices (e.g., other peripheral home appliances) to the Wi-Fi module 112a. The station mode may be a mode in which the communication connection between the unregistered home appliance 10a and a user AP 30 is established by connecting the Wi-Fi module 112a to the user AP 30.

The input unit 120a may include at least one input means to input a predetermined signal or data to the unregistered home appliance 10a by user manipulation. For example, the at least one input means may include a button, a dial, a touch pad, a microphone, and the like.

In some examples, the input unit 120a may include an interface connected to a remote control device. For example, the input unit 120a may receive a control signal from a remote control device through the interface.

The output unit 130a may include output means for notifying the user of various pieces of operation information of the unregistered home appliance 10a. For example, the output unit 130a may include a display or a light output unit as a graphic or text output unit and may include a speaker or a buzzer as an audio output unit.

The driver 140a performs an operation related to a function of the unregistered home appliance 10a and may be different depending on types of the unregistered home appliance 10a. For example, if the unregistered home appliance 10a is a washing machine, the driver 140a may include a drum motor, a water supply device, and any components associated with the operation of the washing machine.

The memory 150a may store various algorithms for the operation of the unregistered home appliance 10a and various pieces of data such as control data for controlling the unregistered home appliance 10a, data for determining whether an error occurs in the unregistered home appliance 10a, and a hidden service set identifier (SSID) list.

The controller 160a may control the overall operation of the unregistered home appliance 10a. The controller 160a may control the driver 140a based on a user-input control command or a function execution command. The controller 160a may include at least one central processing unit (CPU), a microcomputer, a processor, and an integrated circuit (IC).

In some examples, a user may register information on the unregistered home appliance 10a in the server 40 to control the unregistered home appliance 10a using the service provided by the home appliance control system in FIG. 1.

A communication connection between the unregistered home appliance 10a and the server 40 may be established to register information on the unregistered home appliance 10a in the server 40. For example, the Wi-Fi module 112a of the unregistered home appliance 10a connects the user AP 30 and the unregistered home appliance 10a, and the server 40 may be communicatively connected to each other through the user AP 30.

The unregistered home appliance 10a may obtain information regarding the user AP 30 in order for the unregistered home appliance 10a to access the user AP 30. The unregistered home appliance 10a may receive information regarding the user AP 30 from the mobile terminal 20. In some implementations, the unregistered home appliance 10a may receive the information regarding the user AP 30 from the pre-registered home appliance 10b.

In some examples, the Wi-Fi module 112a of the unregistered home appliance 10a may include a virtual interface 113a. In this example, the unregistered home appliance 10a may communicate with two devices at the same time by using the Wi-Fi module 112a including the virtual interface 113a.

For example, the virtual interface 113a is a virtual interface added by time-dividing one physical Wi-Fi interface. The Wi-Fi module 112a may perform a communication function as if two physical Wi-Fi interfaces are operated by using the virtual interface 113a.

In this example, the unregistered home appliance 10a may communicate with the pre-registered home appliance 10b to obtain the information on the user AP 30 and may attempt the communication connection with the user AP 30 based on the information on the user AP 30 while maintaining the communication connection with the pre-registered home appliance 10b.

The information regarding the user AP 30 may include a service set identifier (SSID) and a password of the user AP 30.

The unregistered home appliance 10a may not use the virtual interface 113a when it is attempting the communication connection with the user AP 30. For example, the unregistered home appliance 10a may communicate with the pre-registered home appliance 10b to obtain information regarding the user AP 30, and then attempt the communication connection with the user AP 30 after terminating the connection with the pre-registered home appliance 10b.

For example, when the unregistered home appliance 10a is communicatively connected to the pre-registered home appliance 10b, a certificate-based server may perform an authentication operation for security. By way of further example, the unregistered home appliance 10a and the pre-registered home appliance 10b may communicate with each other by a security channel (e.g., a communication channel used by the pre-registered home appliance 10b).

Related descriptions are described below with respect to FIGS. 6 to 15.

Figure 3:
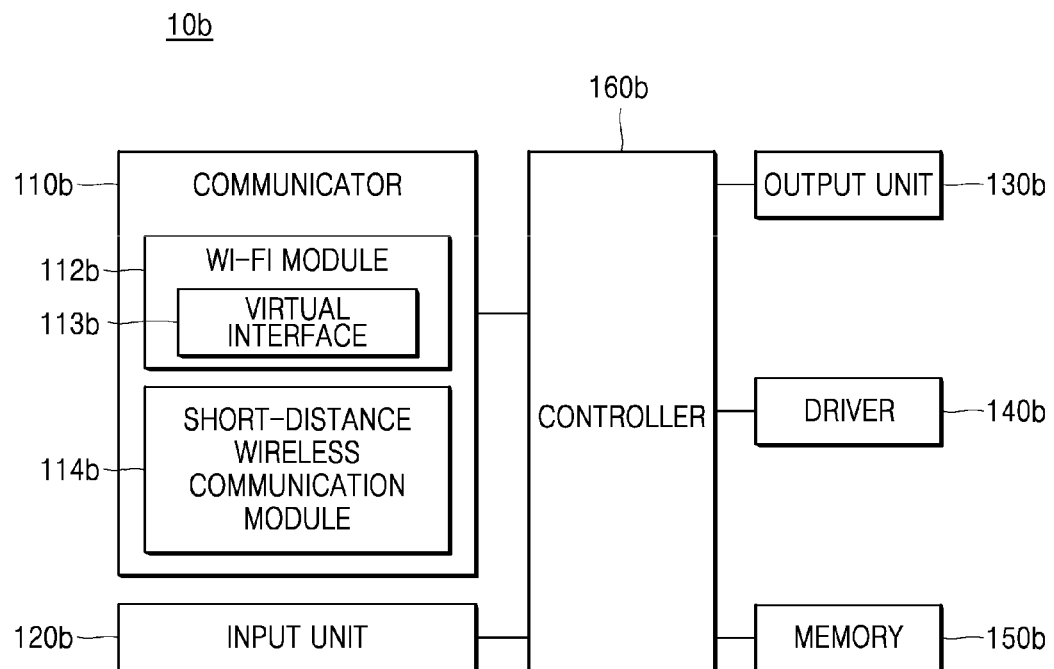
FIG. 3 is an exemplary block diagram depicting the pre-registered home appliance of FIG. 1.

FIG. 3 is an exemplary block diagram depicting the pre-registered home appliance in FIG. 1.

Referring to FIG. 3, a pre-registered home appliance 10b may include a communicator 110b, an input unit 120b, an output unit 130b, a driver 140b, a memory 150b, and a controller 160b. The components of the pre-registered home appliance 10b depicted in FIG. 3 may be further included or excluded depending on types of the pre-registered home appliance 10b.

The communicator 110b may include at least one communication module to communicate the pre-registered home appliance 10b with at least one of a server 40 or an unregistered home appliance 10a. For example, the communicator 110b may include a Wi-Fi module 112b supporting Wi-Fi wireless communication and a short-range communication module 114b such as Bluetooth and near field communication (NFC).

The Wi-Fi module 112b may operate in at least one of an access point (AP) mode or a station mode under the control of the microcomputer of the at least one of the controller 160b or the Wi-Fi module 112b.

The AP mode may be a mode in which a communication connection between the pre-registered home appliance 10b and other peripheral devices is established by connecting and other peripheral devices (e.g., other peripheral home appliances) to the Wi-Fi module 112b. The station mode may be a mode in which a communication connection between the pre-registered home appliance 10b and the user AP 30 is established by connecting the Wi-Fi module 112b to the user AP 30.

The input unit 120b may include at least one input means to input a predetermined signal or data to the pre-registered home appliance 10b by user manipulation. For example, the at least one input means may include a button, a dial, a touch pad, a microphone, and the like.

In some examples, the input unit 120b may include an interface connected to a remote control device. For example, the input unit 120b may receive a control signal from a remote control device through an interface.

The output unit 130b may include output means for notifying the user of various pieces of information on operation of the pre-registered home appliance 10b. For example, the output unit 130b may include a display or a light output unit as a graphic or text output unit and may include a speaker or a buzzer as an audio output unit.

The driver 140b performs an operation related to a function provided by the pre-registered home appliance 10b and examples of the driver 140b may be different depending on types of the pre-registered home appliance 10b. For example, if the pre-registered home appliance 10b is a refrigerator, the driver 140b may include a compressor, an evaporator, a defrost heater, and any components associated with the operation of the refrigerator.

The memory 150b may store various algorithms for the operation of the pre-registered home appliance 10b and various pieces of data such as control data for controlling the pre-registered home appliance 10b, data for determining whether an error occurs in the pre-registered home appliance 10b, and a hidden SSID stored in the list.

The controller 160b may control the overall operation of the pre-registered home appliance 10b. The controller 160b may control the driver 140b based on a user-input control command or a function execution command. The controller 160b may include at least one CPU, the microcomputer, the processor, and the IC.

In some examples, the pre-registered home appliance 10b is already registered in the server 40 and may communicate with the user AP 30, and thus, the user may control the pre-registered home appliance 10b using the service provided by the home appliance control system.

Further, the Wi-Fi module 112b of the pre-registered home appliance 10b may include a virtual interface 113b. In this example, the pre-registered home appliance 10b may communicate with two devices at the same time by using the Wi-Fi module 112b with the virtual interface 113b.

For example, the virtual interface 113b is a virtual interface added by time-dividing one physical Wi-Fi interface. The Wi-Fi module 112b may perform a communication function as if two physical Wi-Fi interfaces are operated through the virtual interface 113b.

In this example, the pre-registered home appliance 10b includes the Wi-Fi module 112 to communicate with the user AP 30 to obtain information regarding the user AP 30 and the virtual interface 113b to periodically operate the Wi-Fi module 112 in the AP mode. In addition, when the Wi-Fi module 112b is operated in the AP mode, the Wi-Fi module 112*b* generates a beacon signal to search for a neighboring unregistered home appliance and may use the hidden SSID. For example, the hidden SSID information may be included in the beacon signal.

In some implementations, the Wi-Fi module 112*b* may be communicatively connected to the unregistered home appliance 10*a* that recognizes the hidden SSID by using the virtual interface 113*b*. In this case, the communication connection may be controlled by the controller 160*b*.

In some implementations, the Wi-Fi module 112*b* may receive a push signal from a communicatively-connected unregistered home appliance 10*a* and may provide a communicatively-connected unregistered home appliance 10*a* with information regarding the user AP 30.

For example, the pre-registered home appliance 10*b* may be communicatively connected to the unregistered home appliance 10*a* through the virtual interface 113*b* while maintaining the communication connection with the user AP 30.

Detailed implementations are described below with respect to FIGS. 6 to 15.

Figure 4:
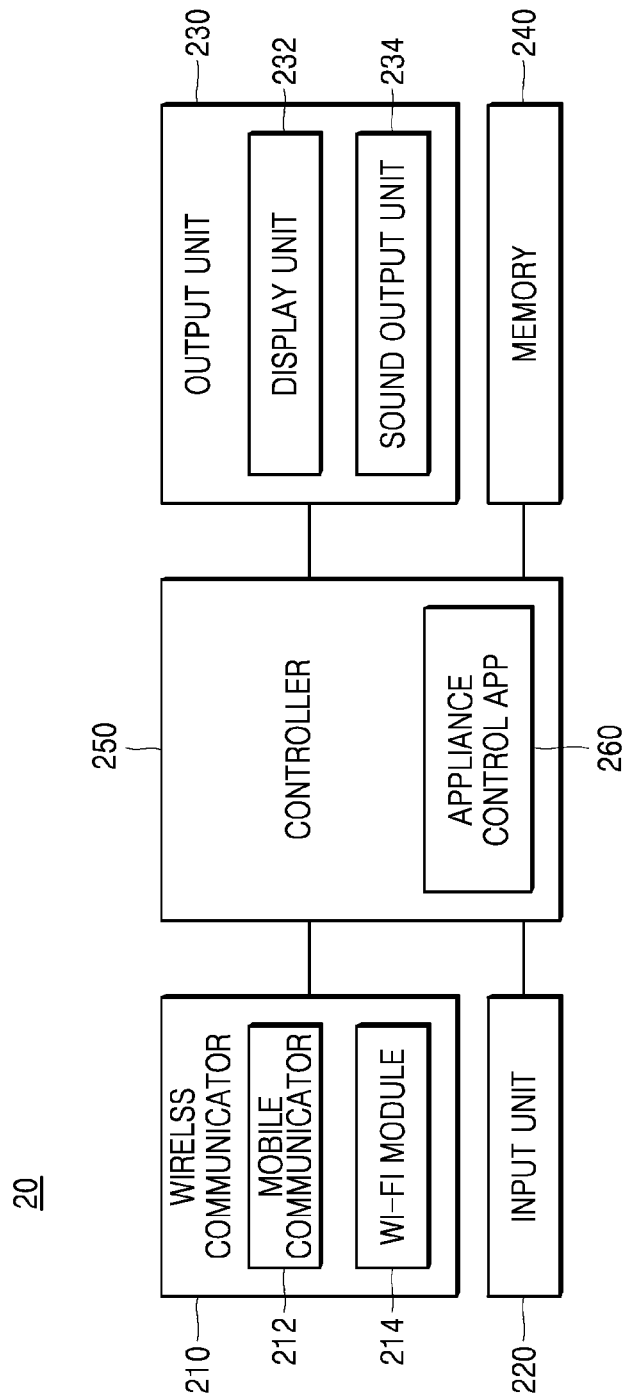
FIG. 4 is an exemplary block diagram depicting the mobile terminal of FIG. 1.

FIG. 4 is an exemplary block diagram depicting the mobile terminal in FIG. 1.

Referring to FIG. 4, a mobile terminal 20 may include a wireless communicator 210, an input unit 220, an output unit 230, a memory 240, and a controller 250. The components thereof depicted in FIG. 4 are not example components for implementing the mobile terminal 20 and the mobile terminal 20 may include more or fewer components.

The wireless communicator 210 may include at least one communication module to execute communication connection between the mobile terminal 20 and the server 40. For example, the wireless communicator 210 may include a mobile communication module 212 using long term evolution (LTE), a Wi-Fi module 214, other short-range communication modules, or a wireless Internet module.

The input unit 220 may include an image input unit (e.g., a camera) to receive a video signal, a microphone to receive an audio signal, an audio input unit, or a user input unit to receive information from a user (e.g., a touch key and a push key (e.g., a mechanical key)).

The output unit 230 generates output in the form of visual, auditory, or tactile manner. For example, the output unit 230 may include a display unit 232 and an audio output unit 234.

In some examples, the display unit 232 may be stacked with a touch sensor to form a layer structure or may be integrated with the touch sensor to implement a touch screen. The touch screen functions as a user input unit to provide an input interface between the mobile terminal 20 and the user (e.g., to receive a touch input from a user) and also provides an output interface between the mobile terminal 20 and the user.

For example, an image displayed on the display unit 232 may be controlled by the controller 250 and the display unit 232 may provide the controller 250 with the touch input received from the user.

The memory 240 may store data used to support various functions of the mobile terminal 20. The memory 240 may store a number of applications executed on the mobile terminal 20, data, commands, and a hidden SSID list for operation of the mobile terminal 20. At least a portion of the applications may be downloaded from external servers via wireless communication.

The controller 250 may control overall operation of the mobile terminal 20.

The controller 250 may process signals, data, information, and the like input or output by the above components or may execute an application stored in the memory 240, thereby providing appropriate information to a user or processing appropriate functions.

For example, the controller 250 of the mobile terminal 20 may drive an appliance control application (APP) 260. The appliance control APP 260 may control a home appliance (e.g., a pre-registered home appliance 10*b*) registered on a service provided by the home appliance control system.

The appliance control APP 260 may be downloaded from the server 40 or a server providing an application download service and may be stored in the memory 240.

The user may perform various managements such as controlling the pre-registered home appliance 10*b* using the appliance control APP 260, registering the unregistered home appliance 10*a* on the service, or removing the pre-registered home appliance 10*b* from the service.

For example, when the appliance control APP 260 is executed, the pre-registered home appliances may be automatically or manually searched. For example, pre-registered home appliances may be automatically searched based on the beacon signal generation.

In some examples, all pre-registered home appliances operating in the AP mode and all pre-registered home appliances connected to the same user AP 30 similar to the mobile terminal 20 may be searched. The hidden SSID may match a hidden SSID in the list stored in the memory 240 of the mobile terminal 20.

In addition, all pre-registered home appliances searched by the mobile terminal 20 may provide the mobile terminal 20 with a push signal. In this case, the controller 250 of the mobile terminal 20 controls the display unit 232 to display a communication connection selection screen of the pre-registered home appliance based on the push signal of the pre-registered home appliance and controls the input unit 220 or the display unit 232 to receive, from the user, the communication connection selection input for the pre-registered home appliance. In addition, the controller 250 may control the display unit 232 to display a registration confirmation key input guide screen of the pre-registered home appliance based on the received communication connection selection input. When the user completes the registration confirmation key input to the pre-registered home appliance, the pre-registered home appliance may be immediately controlled by the appliance control APP 260.

The home appliance control system may include the above-described configuration and features. Hereinafter, the home appliance 10*a* registered on a home appliance control service provided by the home appliance control system will be described with respect to FIGS. 5 to 15.

Figure 5:
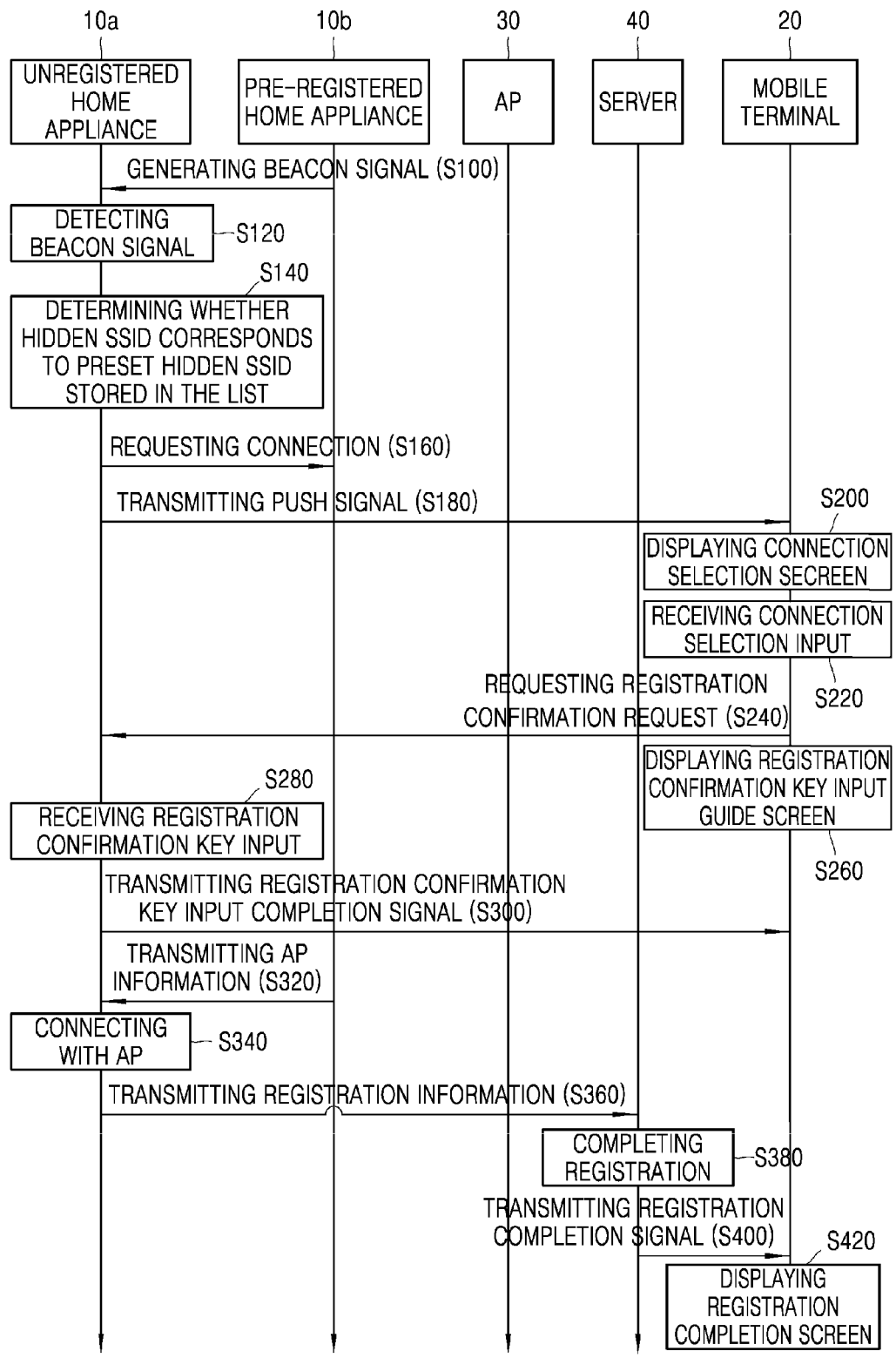
FIG. 5 is an exemplary ladder diagram depicting an unregistered home appliance registration service of the home appliance control service of FIG. 1.

FIG. 5 is an exemplary ladder diagram depicting an unregistered home appliance registration service of the home appliance control services in FIG. 1.

Hereinafter, for the convenience of description, a home appliance 10 registered or controlled by users may also refer to a product.

In addition, the implementation is described in which the product 10 is communicatively connected to other products and the user AP 30 by using the Wi-Fi modules 112*a* and 112*b*, but the present implementations is not only limited to the Wi-Fi modules 112*a* and 112*b* and may be applied to a wireless communication module to support other similar wireless communication schemes.

Hereinafter, controllers 160*a* and 160*b* of the product 10 are described as controlling the operations of Wi-Fi modules 112*a* and 112*b*, but the operation of each of the Wi-Fi modules 112*a* and 112*b* may also be controlled by a microcomputer of each of the Wi-Fi modules 112*a* and 112*b*. For example, the controllers 160a and 160b of the product 10 may include a main controller of the product 10 and the microcomputer of the Wi-Fi modules 112a and 112b.

Referring to FIG. 5, the pre-registered home appliance 10b generates a beacon signal (S100).

In some examples, the controller 160b of the pre-registered home appliance 10b may control the Wi-Fi module 112b to obtain information regarding the user AP 30 from the user AP 30 and periodically operate in an AP mode. The Wi-Fi module 112b receives the information regarding the user AP 30 from the user AP 30.

The Wi-Fi module 112b may generate a beacon signal to search for a nearby unregistered home appliance 10a when the Wi-Fi module 112b operates in the AP mode. In some implementations, the Wi-Fi module 112b may use a hidden SSID when the Wi-Fi module 112b operates in the AP mode.

The unregistered home appliance 10a may detect the beacon signal (S120).

In some examples, the controller 160a of the unregistered home appliance 10a may control the Wi-Fi module 112a to search for the pre-registered home appliance 10b that transmits the beacon signal.

For example, the controller 160a of the unregistered home appliance 10a may control the Wi-Fi module 112a to search for the pre-registered home appliance 10b to transmit the beacon signal when a specific event (e.g., a turn-on of a washing machine) occurs.

When detecting the beacon signal, the Wi-Fi module 112a may search for the pre-registered home appliance 10b to transmit the beacon signal based on the detected beacon signal.

When the beacon signal is detected (S120), the unregistered home appliance 10a may determine whether the hidden SSID of the searched pre-registered home appliance 10b matches the preset hidden SSID stored in the list (S140).

In some examples, the memory 150a of the unregistered home appliance 10a may store a preset hidden SSID list. The preset hidden SSID list may be a list recording a plurality of hidden SSIDs used for products manufactured by a specific manufacturer.

In this example, the controller 160a may compare the hidden SSID of the pre-registered home appliance 10b searched by the Wi-Fi module 112a with the preset hidden SSID in the list stored in the memory 150a and may determine whether the hidden SSID of the pre-registered home appliance 10b searched by the Wi-Fi module 112a matches the preset hidden SSID in the list stored in the memory 150a based on the comparison result.

Then, if the hidden SSID of the searched pre-registered home appliance 10b matches the preset hidden SSID stored in the list, the unregistered home appliance 10a may request a communication connection to the pre-registered home appliance 10b (S160).

In some examples, when the controller 160a determines that the hidden SSID of the searched pre-registered home appliance 10b matches the preset hidden SSID stored in the list, the controller 160a may control the Wi-Fi module 112a to attempt the communication connection (e.g., to transmit the connection request) with the searched pre-registered home appliance 10b.

In some implementations, when the virtual interface 113b of the Wi-Fi module 112b receives the communication connection request from the unregistered home appliance 10a that has recognized the hidden SSID, the controller 160b of the pre-registered home appliance 10b may control the Wi-Fi module 112b to communicatively connect with the unregistered home appliance 10a that has recognized the hidden SSID.

When the unregistered home appliance 10a and the pre-registered home appliance 10b are communicatively connected through the above process, the unregistered home appliance 10a may transmit a push signal to the pre-registered home appliance 10b (S180).

For example, when the Wi-Fi module 112a of the unregistered home appliance 10a is communicatively connected to the searched pre-registered home appliance 10b, the controller 160a of the unregistered home appliance 10a may control the Wi-Fi module 112a to transmit the push signal to the communicatively-connected pre-registered home appliance 10b.

When the Wi-Fi module 112b receives the push signal from the communicatively-connected unregistered home appliance 10a, the controller 160b of the pre-registered home appliance 10b may control the Wi-Fi module 112b to transmit the push signal to the server 40 through the user AP 30.

In addition, the server 40 may transmit the push signal received through the user AP 30 to the mobile terminal 20 and the mobile terminal 20 may receive the push signal of the unregistered home appliance 10a by using the Wi-Fi module 214.

Through this process, the push signal may be transmitted from the unregistered home appliance 10a to the mobile terminal 20.

When the mobile terminal 20 receives the push signal, the mobile terminal 20 may display a connection selection screen of the unregistered home appliance 10a (S200).

In some examples, the controller 250 of the mobile terminal 20 may control the display unit 232 to display the connection selection screen of the unregistered home appliance 10a based on the push signal of the unregistered home appliance 10a.

For example, when the controller 250 of the mobile terminal 20 receives the push signal of the unregistered home appliance 10a by using the Wi-Fi module 214, the controller 250 may execute the appliance control APP 260 based on the push signal. Then, as the appliance control APP 260 is executed, the controller 250 may control the display unit 232 to display an execution screen of the APP 260 (e.g., a connection selection screen of the unregistered home appliance 10a).

Figure 6:
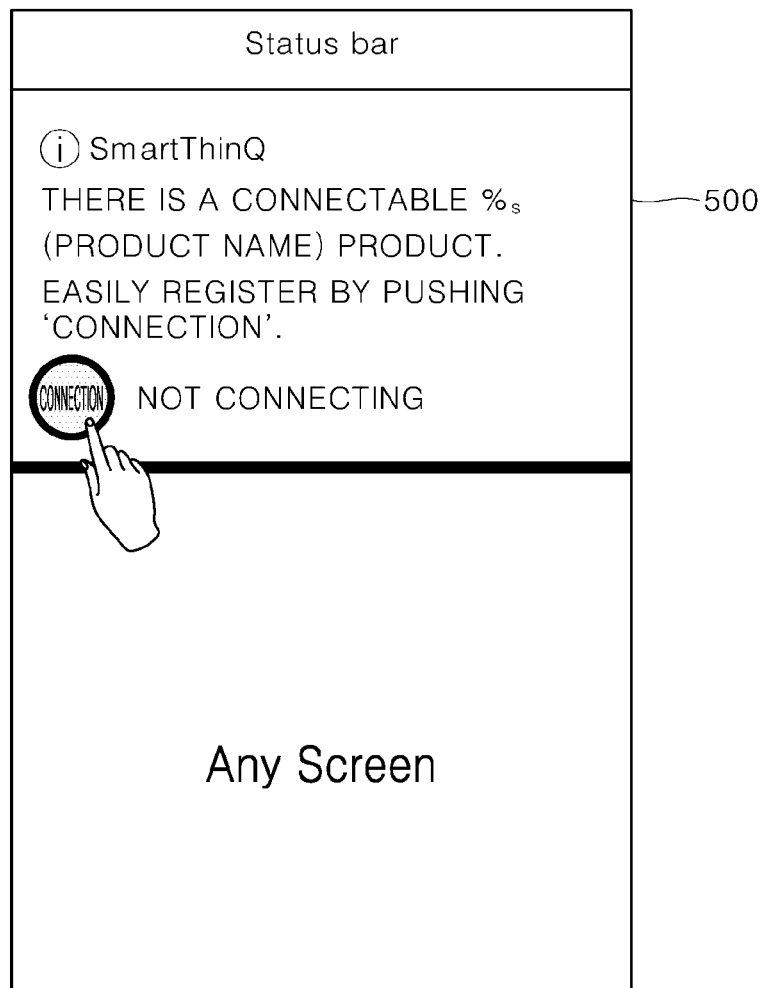
FIGS. 6 to 9 depict exemplary screens displayed on displays of mobile terminals with respect to the unregistered home appliance registration service of FIG. 5.

FIG. 6 depicts an example of a connection selection screen 500 of an unregistered home appliance 10a displayed on a display unit 232.

When the connection selection screen is displayed on the display unit 232, the display unit 232 of the mobile terminal 20 may receive a connection selection input from the user (S220).

In some examples, when the user touches a "connection" portion of the connection selection screen 500 depicted in FIG. 6, the display unit 232 of the mobile terminal 20 may receive the connection selection input. In some implementations, the display unit 232 may provide the controller 250 with the received connection selection input.

For example, the user may touch the "connection" portion of the connection selection screen 500 within a predetermined time period.

If the user does not touch "the connection" of the connection selection screen 500 within the predetermined time period, the display unit 232 of the mobile terminal 20 may display all communicable unregistered home appliance list selection screen 540 (see FIG. 10) including the unregistered home appliance 10a. "When the user does not touch within the predetermine time period" corresponds to "when the controller 250 does not receive the connection selection input to the unregistered home appliance 10a by using the display unit 232 within the predetermined time period". Details thereof are described below.

When the connection selection input is provided to the controller 250, the mobile terminal 20 may transmit a registration confirmation request to the server 40 (S240).

In some examples, the controller 250 of the mobile terminal 20 may control the Wi-Fi module 214 to transmit, to the server 40, the registration confirmation request for the unregistered home appliance 10a based on the connection selection input received from the display unit 232.

The controller 160b of the pre-registered home appliance 10b may control the Wi-Fi module 112b to receive the registration confirmation request for the unregistered home appliance 10a from the server 40 connected to the user AP 30. In this case, the controller 160b of the pre-registered home appliance 10b may control the Wi-Fi module 112b to transmit the registration confirmation request to the unregistered home appliance 10a. In some examples, the unregistered home appliance 10a may receive the registration confirmation request from the pre-registered home appliance 10b by using the Wi-Fi module 112a.

The registration confirmation request may be transmitted from the mobile terminal 20 to the unregistered home appliance 10a through the above process.

When the registration confirmation request is transmitted from the mobile terminal 20 to the server 40, the mobile terminal 20 may display a registration confirmation key input guide screen of the unregistered home appliance 10a (S260).

In some examples, the controller 250 of the mobile terminal 20 may control the display unit 232 to display the registration confirmation key input guide screen of the unregistered home appliance 10a.

For example, the controller 250 of the mobile terminal 20 may control the Wi-Fi module 214 to transmit, to the server 40, the registration confirmation request for the unregistered home appliance 10a and may control the appliance control APP 260 to display, on the display unit 232, the registration confirmation key input guide screen of the unregistered home appliance 10a.

In some examples, an operation of transmitting the registration confirmation request to the server 40 (S240) and an operation of displaying the registration confirmation key input guide screen (S260) may be simultaneously performed.

Figure 7:
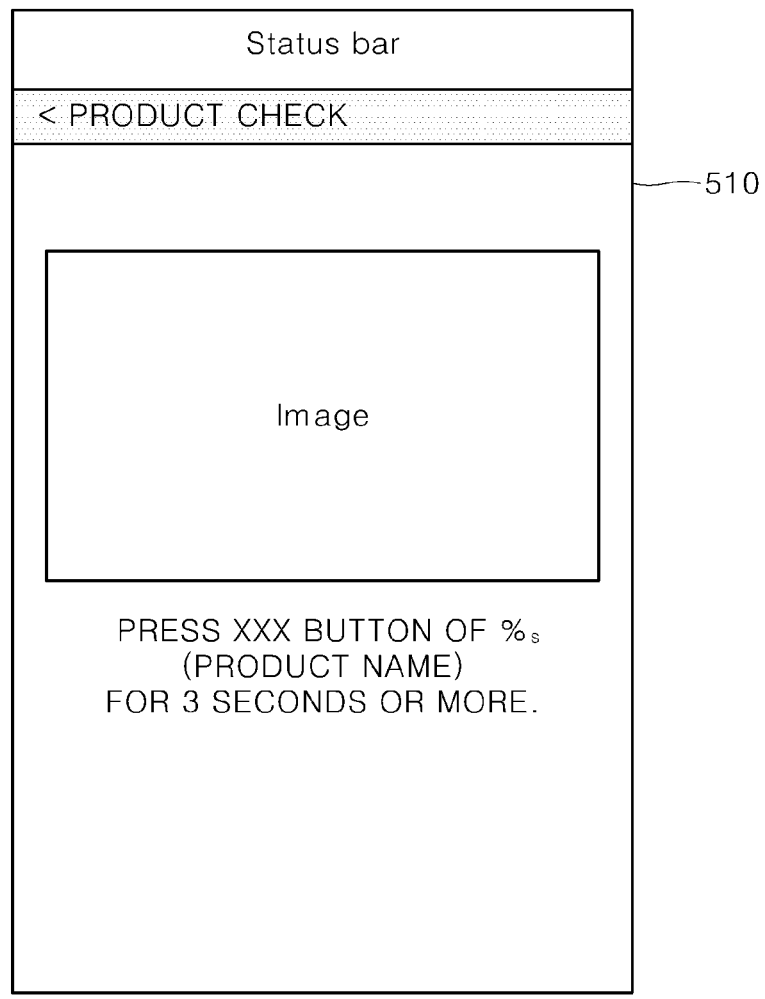

FIG. 7 depicts an example of a registration confirmation key input guide screen 510 of an unregistered home appliance 10a displayed on a display unit 232.

For example, the registration confirmation key input guide screen 510 may display user operation executed to perform the registration confirmation of the unregistered home appliance 10a. For example, the registration confirmation key input guide screen 510 may display the phrase "Please press a XXX button of the unregistered home appliance 10a for 3 seconds or more".

When the registration confirmation key input guide screen 510 is displayed, an input unit 120a of the unregistered home appliance 10a may receive a registration confirmation key input from a user (S280).

In some examples, when the user inputs the registration confirmation key to the unregistered home appliance 10a using the method depicted in FIG. 7, the input unit 120a of the unregistered home appliance 10a may receive a registration confirmation key input. Then, the input unit 120a may provide the controller 160a with the received registration confirmation key input.

When the controller 160a receives the registration confirmation key input, the controller 160a of the unregistered home appliance 10a may transmit the registration confirmation key input completion signal to the pre-registered home appliance 10b (S300).

In some examples, the controller 160a of the unregistered home appliance 10a may control the Wi-Fi module 12a to receive the registration confirmation request from the pre-registered home appliance 10b. Then, when the registration confirmation key input from the user is determined, the controller 160a of the unregistered home appliance 10a may control the Wi-Fi module 112a to transmit the registration confirmation key input completion signal to the pre-registered home appliance 10b.

When the Wi-Fi module 112b receives the registration confirmation key input completion signal from the unregistered home appliance 10a, the controller 160b of the pre-registered home appliance 10b may control the Wi-Fi module 112b to transmit the registration confirmation key input completion signal to the server 40 through the user AP 30.

In some implementations, the controller 250 of the mobile terminal 20 may control the Wi-Fi module 214 to receive the registration confirmation key input completion signal from the server 40.

For example, when the Wi-Fi module 214 does not receive a signal related to success or failure of registration of the unregistered home appliance 10a after receiving the registration confirmation key input completion signal from the server 40, the controller 250 of the mobile terminal 20 may control the display unit 232 to display a registration progress screen of the unregistered home appliance 10a.

Figure 8:
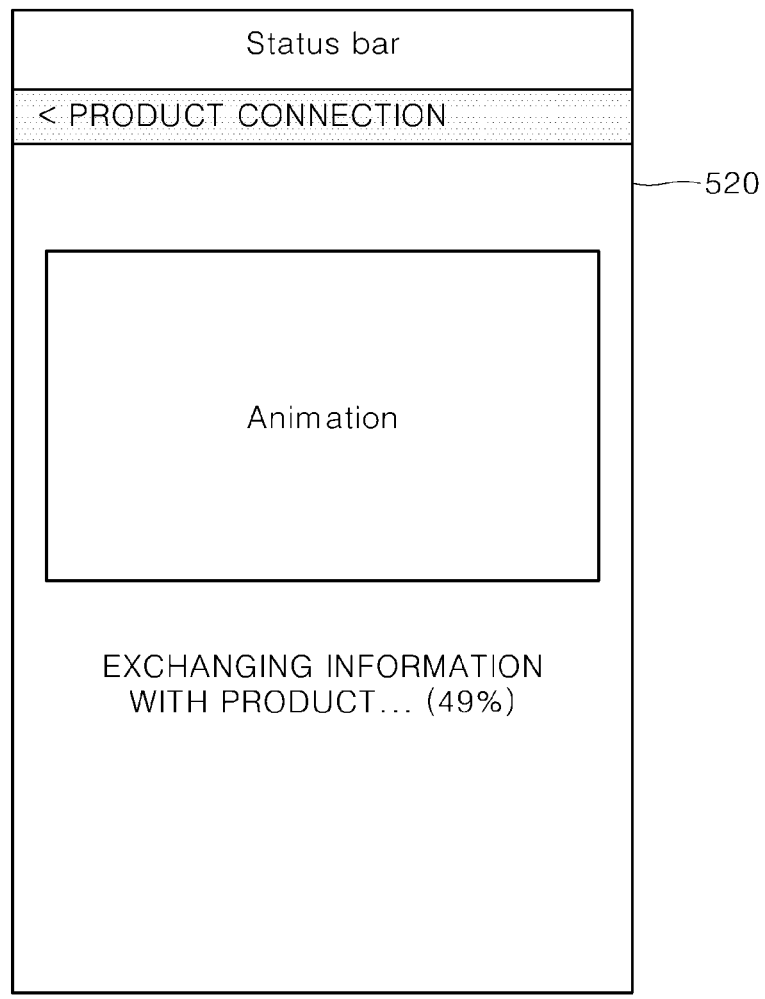

FIG. 8 shows an example of a registration progress screen 520 of an unregistered home appliance 10a displayed on a display unit 232.

For example, the registration progress screen may display the phrase 'Exchanging information with the product . . . (XX %)'. Furthermore, the registration progress screen may display the phrase 'Registering a product in a server . . . (XX %)' subsequent to 'Exchanging information with the product . . . (XX %)'.

When the registration confirmation key input completion signal is provided to the pre-registered home appliance 10b, the pre-registered home appliance 10b may transmit information regarding the user AP 30 to the unregistered home appliance 10a (S320).

When the Wi-Fi module 112b receives the registration confirmation key input completion signal from the unregistered home appliance 10a, the controller 160b of the pre-registered home appliance 10b may transmit the information regarding user AP 30 to the unregistered home appliance 10a and may control the Wi-Fi module 112b to transmit the registration confirmation key input completion signal to the server 40 through the user AP 30.

When the unregistered home appliance 10a receives the information regarding the user AP 30, the unregistered home appliance 10a may be communicatively connected to the user AP 30 (S340).

For example, when the Wi-Fi module 112a receives, from the pre-registered home appliance 10b, the information regarding the user AP 30 connected to the pre-registered home appliance 10b, the controller 160a of the unregistered home appliance 10a may control the Wi-Fi module 112a to attempt the connection with the user AP 30 based on the information regarding the user AP 30 through a virtual interface 113*a*.

For example, the unregistered home appliance 10*a* is connected to the pre-registered home appliance 10*b* to obtain information regarding the user AP 30 and may attempt to connect with the user AP 30 by using the virtual interface 113*a* while maintaining the connection with the pre-registered home appliance 10*b*.

In some examples, the unregistered home appliance 10*a* may not use the virtual interface 113*a* when the unregistered home appliance 10*a* attempts a communication connection with the user AP 30. For example, the unregistered home appliance 10*a* is connected to the pre-registered home appliance 10*b* to obtain the information regarding the user AP 30 and may attempt the communication connection with the user AP 30 after terminating the connection with the pre-registered home appliance 10*b*.

When the unregistered home appliance 10*a* is communicatively connected to the user AP 30, the unregistered home appliance 10*a* may transmit registration information to the server 40 through the user AP 30 (S360).

In some examples, when the unregistered home appliance 10*a* is successfully connected to the user AP 30, the controller 160*a* of the unregistered home appliance 10*a* may control the Wi-Fi module 112*a* to transmit, to the server 40 and through the user AP 30, registration information including unique information of the unregistered home appliance 10*a*.

The unique information of the unregistered home appliance 10*a* is used to identify a product and may include, for example, a serial number. For example, products have different unique information. In some implementations, the unique information may be used to correspond a user account (or a user's mobile terminal) and the product in the server 40.

When the server 40 receives the registration information, the server 40 may complete a registration operation for the unregistered home appliance 10*a* (S380).

In some examples, when the server 40 receives, from the user AP 30, the registration information of the unregistered home appliance 10*a*, the server 40 may complete the operation of registering the unregistered home appliance 10*a* based on the received registration information of the unregistered home appliance 10*a*.

When the server 40 completes the registration operation, the server 40 may transmit a registration completion signal to the mobile terminal 20 (S400).

In some examples, the server 40 may transmit the registration completion signal of the unregistered home appliance 10*a* to the Wi-Fi module 214 of the mobile terminal 20 after the server 40 completes the registration operation. In some implementations, the controller 250 of the mobile terminal 20 may control the Wi-Fi module 214 to receive, from the server 40, the registration completion signal of the unregistered home appliance 10*a*.

When the Wi-Fi module 214 receives the registration completion signal, the mobile terminal 20 may display a registration completion screen (S420).

In some examples, when the Wi-Fi module 214 receives, from the server 40, the registration completion signal of the unregistered home appliance 10*a*, the controller 250 of the mobile terminal 20 may control the display unit 232 to display the registration completion screen of the unregistered home appliance 10*a*.

For example, when the Wi-Fi module 214 receives the registration completion signal of the unregistered home appliance 10*a*, the controller 250 of the mobile terminal 20 may control an appliance control APP 260 to display a registration completion screen of the unregistered home appliance 10*a*.

Figure 9:
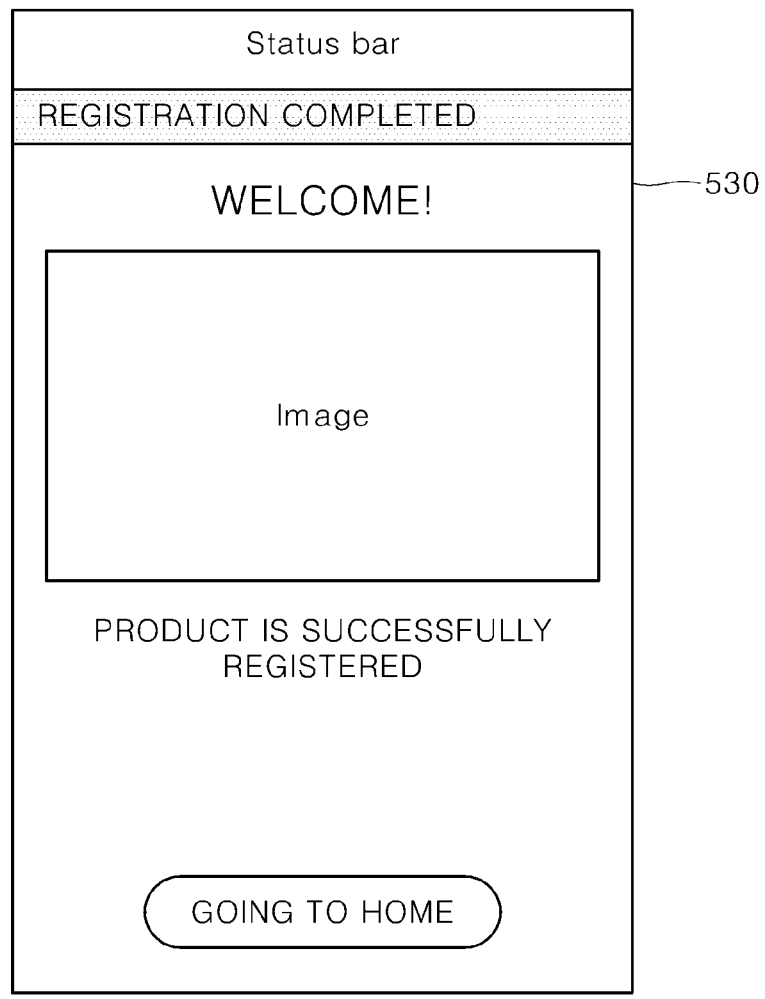

FIG. 9 depicts an example of a registration completion screen 530 of an unregistered home appliance 10*a* displayed on a display unit 232.

If the unregistered home appliance 10*a* fails to be communicatively connected to the user AP 30 at S340, the unregistered home appliance 10*a* may transmit a registration failure signal to the pre-registered home appliance 10*b*, the pre-registered home appliance 10*b* may transmit the registration failure signal to a server 40 through the user AP 30, and the server 40 may transmit the registration failure signal to the mobile terminal 20.

When the Wi-Fi module 214 receives, from the server 40, the registration failure signal of the unregistered home appliance 10*a*, the controller 250 of the mobile terminal 20 may control the display unit 232 to display a screen including the reason for registration failure of the unregistered home appliance 10*a* based on the registration failure signal.

Then, when the input unit 220 or the display unit 232 receives the user's registration retry selection input for the unregistered home appliance 10*a* based on the screen including the reason for registration failure, the controller 250 of the mobile terminal 20 may control the display unit 232 to display an existing product registration guide screen based on the received registration retry selection input.

Figure 11:
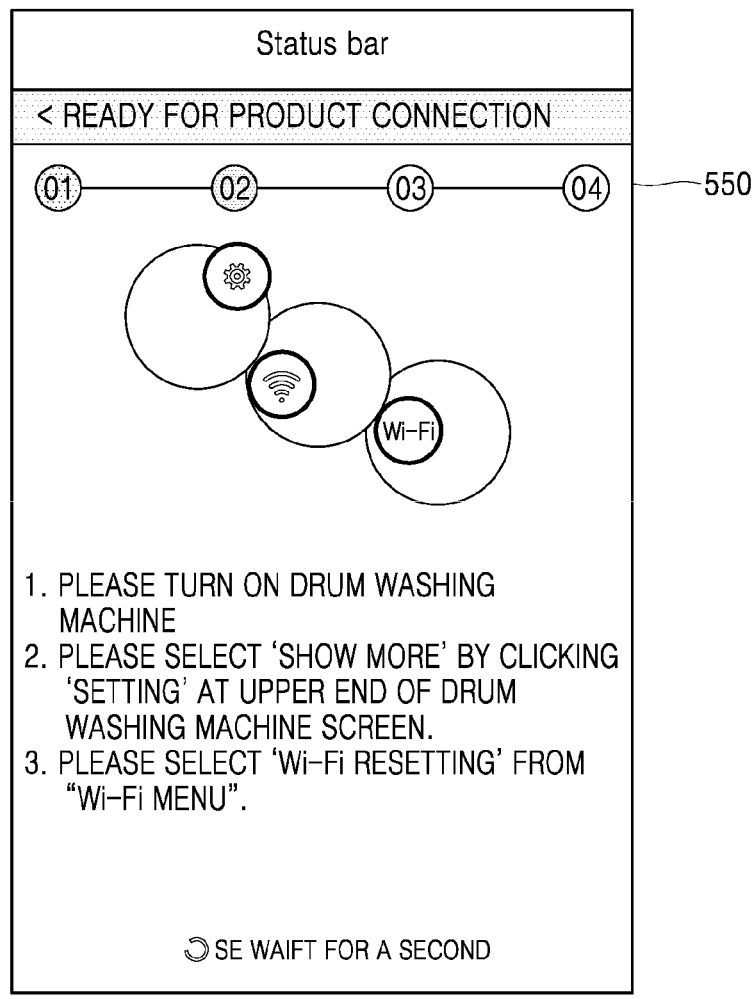
Figure 12:
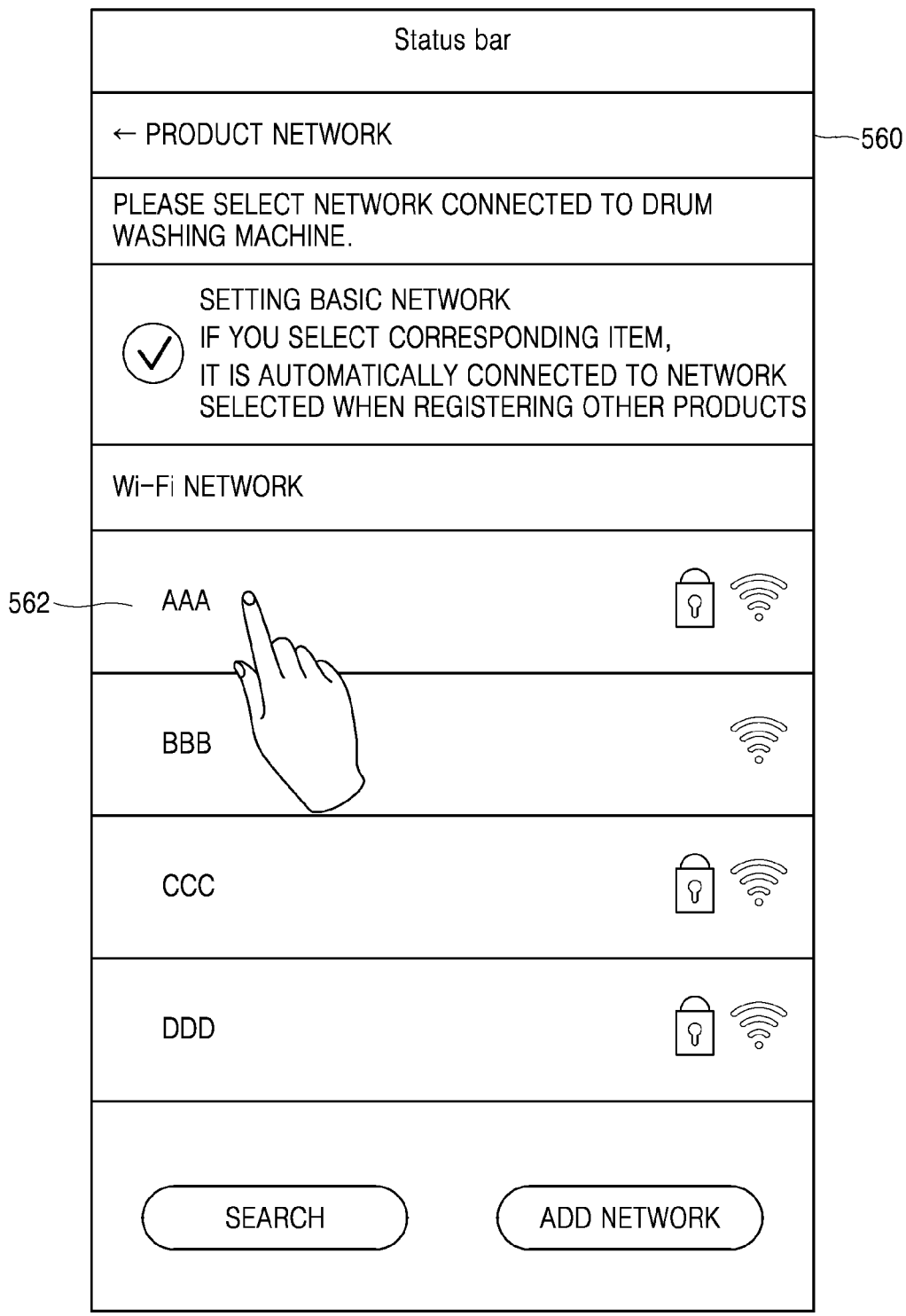
Figure 13:
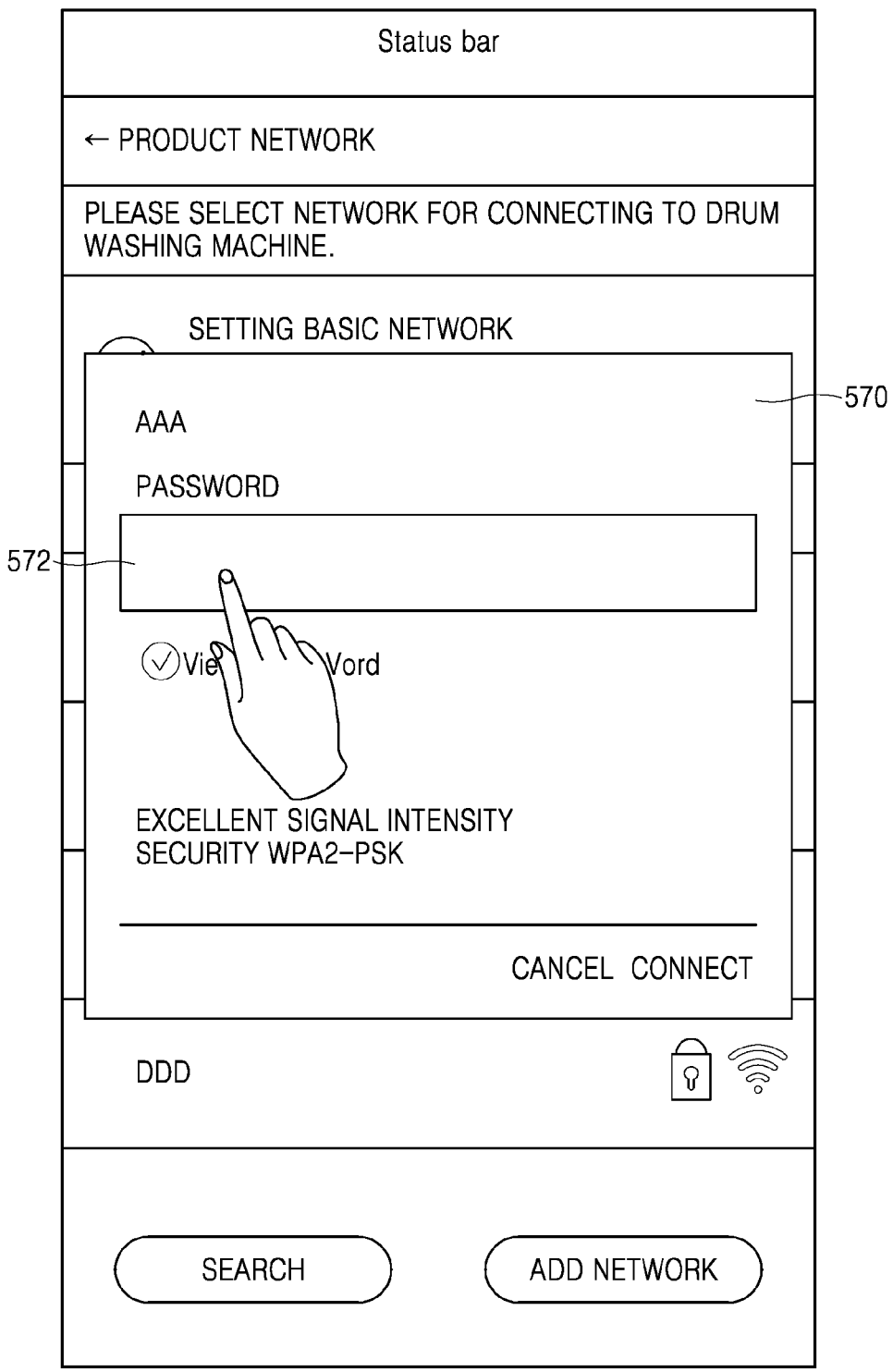

For example, the existing product registration guide screen may include, for example, screens depicted in FIGS. 11 to 13.

If the user fails to touch "the connection" of the connection selection screen 500 (see FIG. 6) within a predetermined time period at S220, the display unit 232 of the mobile terminal 20 may display all communicable unregistered home appliance list selection screen 540 (see FIG. 10) including the unregistered home appliance 10*a*. In this case, "when the user fails to touch within a predetermined time period" corresponds to "when the controller 250 fails to receive the connection selection input to the unregistered home appliance 10*a* through the display unit 232 within a predetermined time period".

Figure 10:
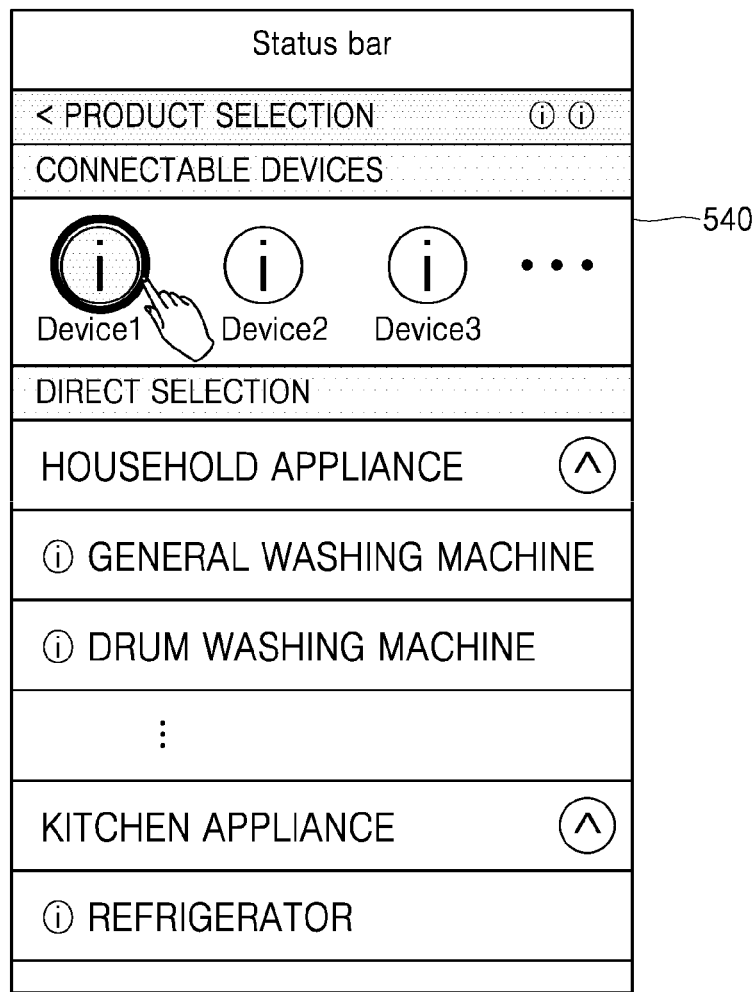
FIGS. 10 to 13 depict exemplary screens displayed on displays of mobile terminals with respect to an example of a registration service provided when a connection selection input to an unregistered home appliance is not received within a predetermined time period.

FIG. 10 depicts an exemplary communicable unregistered home appliance list screen 540.

For example, a controller 250 of a mobile terminal 20 may control an appliance control APP 260 to display, on a display unit 232, a communicable unregistered home appliance list selection screen 540 including an unregistered home appliance 10*a*.

For example, the screen 540 may display connectable unregistered home appliance list (e.g., Device 1, Device 2, and Device 3), as well as various product line options (e.g., a household appliance—a general washing machine, a drum washing machine; a kitchen appliance—a refrigerator).

When the user touches the unregistered home appliance 10*a* (e.g., Device 1) on the communicable unregistered home appliance list selection screen 540, the display unit 232 of the mobile terminal 20 may receive the connection selection input for the unregistered home appliance 10*a* (e.g., Device 1). The display unit 232 may provide the controller 250 with the received connection selection input.

For example, when the controller 250 receives the connection selection input for the unregistered home appliance 10*a* from the display unit 232, the controller 250 of the mobile terminal 20 may control the display unit 232 to display an existing product registration guide screen or a registration guide screen for the unregistered home appliance 10a based on the received connection selection input.

The existing product registration guide screen may include, for example, screens depicted in FIGS. 11 to 13.

In some examples, the controller 250 of the mobile terminal 20 may display a screen 550 requesting the user to activate the Wi-Fi module 112a of the unregistered home appliance 10a.

When the user activates the Wi-Fi module 112a of the unregistered home appliance 10a, the Wi-Fi module 112a of the unregistered home appliance 10a may be switched to an AP mode. As the Wi-Fi module 112a is switched to the AP mode, the Wi-Fi module 214 of the mobile terminal 20 may access the Wi-Fi module 112a of the unregistered home appliance 10a.

Referring to FIGS. 12 and 13, when the mobile terminal 20 and the unregistered home appliance 10a are connected based on the connection result, the controller 250 may display screens to obtain information regarding user AP 30 for transmitting to the unregistered home appliance 10a.

For example, the controller 250 may control the AP selection screen 560 depicted in FIG. 12 to receive the selection input for the user AP 30 to connect with the unregistered home appliance 10a in the list including at least one AP. For example, when the user selects an item 562 with the name of 'AAA', corresponding to the user AP 30, the controller 250 may control the Wi-Fi module 214 to transmit the information regarding the user AP 30 to the unregistered home appliance 10a.

According to some implementations, when a password is needed for connecting to the selected user AP 30, the controller 250 may control a display unit 232 to display a password input window 570 to obtain the password of the user AP 30 as depicted in FIG. 13. The user may enter a password to a password input tab 572 of the password input window 570 and the controller 250 may control the Wi-Fi module 214 to transmit, to the unregistered home appliance 10a, the information on user AP 30 including the input password.

In this case, the unregistered home appliance 10a may be communicatively connected to the corresponding user AP 30 based on information regarding the user AP 30 received from the mobile terminal 20 and may be registered in the server 40 through the user AP 30 communicatively connected to the unregistered home appliance 10a.

Figure 14:
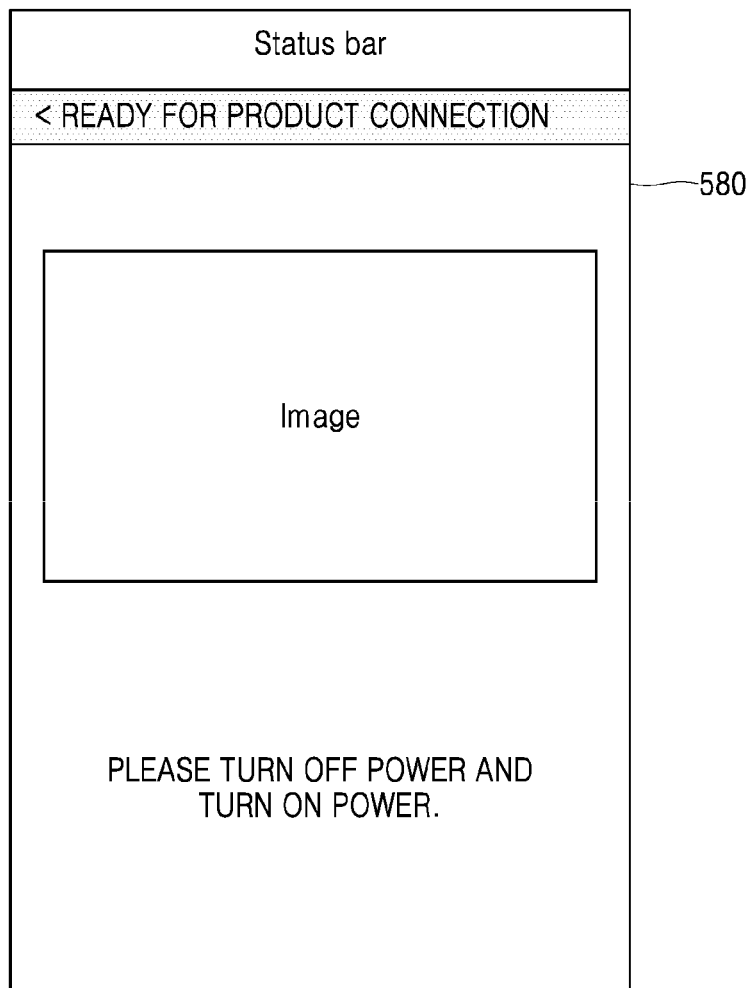
FIGS. 14 and 15 depict exemplary screens displayed on a display of a mobile terminal with respect to another example of a registration service provided when a connection selection input to an unregistered home appliance is not received within a predetermined time period.
Figure 15:
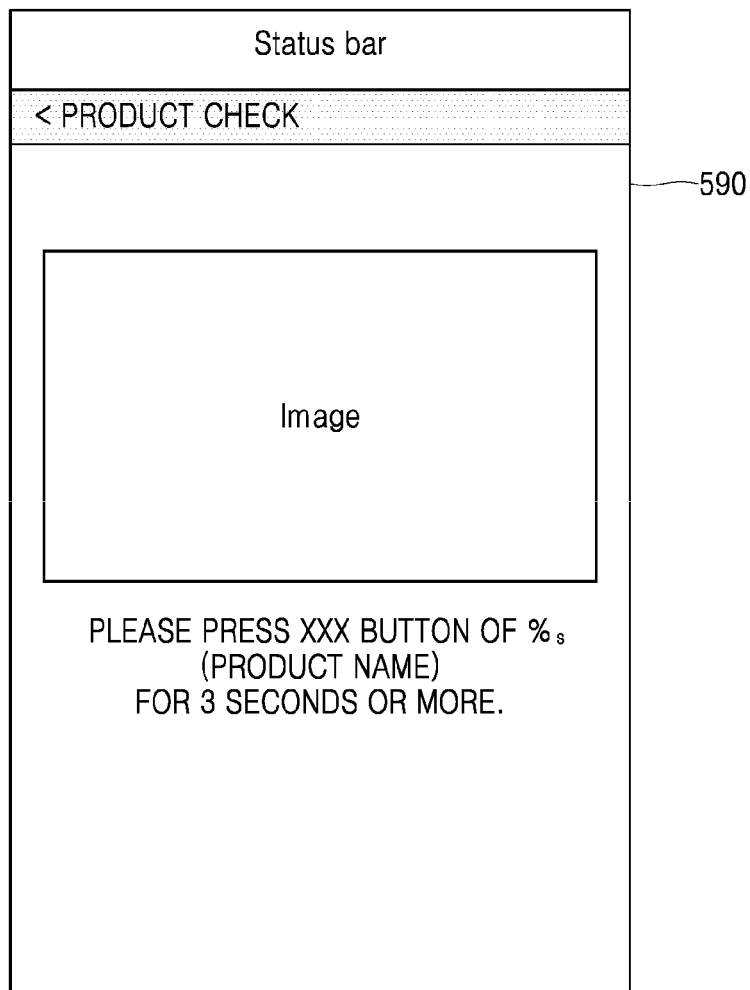

In some examples, the re-registration guide screen for the unregistered home appliance 10a may include, for example, screens depicted in FIGS. 14 and 15.

In some examples, a controller 250 of the mobile terminal 20 may display a screen 580 requesting a user to switch to a client mode (e.g., reboot) of the unregistered home appliance 10a.

When the unregistered home appliance 10a is switched to the client mode, the unregistered home appliance 10a may transmit a client mode switch completion signal to the pre-registered home appliance 10b, the pre-registered home appliance 10b may transmit the client mode switch completion signal to the server 40 through the user AP 30, and the server 40 may transmit the client mode switch completion signal to the mobile terminal 20.

In this case, the controller 250 of the mobile terminal 20 may control the Wi-Fi module 214 to transmit, to the server 40, the registration confirmation request for the unregistered home appliance 10a based on the received client mode switch completion signal and may control the display unit 232 to display the registration confirmation key input guide screen of the unregistered home appliance 10a.

Thereafter, steps S280 to S420 described above with respect to FIG. 5 may be applied.

The home appliance control system performs the unregistered home appliance registration service to improve a registration mechanism of the unregistered home appliance.

According to some implementations, the home appliance control system performs the operation of searching for the unregistered home appliance by using the pre-registered home appliance, not by the mobile terminal, to limit battery consumption of the mobile terminal due to the scan operation performed on the AP device.

In addition, according to some implementations, the home appliance control system may transmit, to the unregistered home appliance, the network information already used when registering the pre-registered home appliance through communication between the home appliances, without additional user input, to improve a product registration success rate.

Although the present disclosure has been described as described above with reference to exemplary drawings, the present disclosure is not limited to the implementations and drawings disclosed herein, and various modifications can be made by those skilled in the art within the scope of the technical idea of the present disclosure. Further, even if working effects obtained based on configurations of the present disclosure are not explicitly described in the description of implementations of the present disclosure, effects predictable based on the corresponding configuration have to be recognized.

What is claimed is:

1. A home appliance configured to be registered in a server, comprising:
    a wireless fidelity (Wi-Fi) module, based on the home appliance being registered in the server, communicatively connected to an access point (AP) and configured to periodically operate in an AP mode through a virtual interface; and
    a controller configured to control the Wi-Fi module to periodically operate in the AP mode,
    wherein the Wi-Fi module is configured to generate a beacon signal to search for an unregistered home appliance based on the Wi-Fi module being operated in the AP mode,
    wherein the Wi-Fi module is configured to use a hidden service set identifier (SSID) based on the Wi-Fi module being operated in the AP mode,
    wherein the controller is configured to control, based on the virtual interface receiving a communication connection request from an unregistered home appliance that recognized the hidden SSID, the Wi-Fi module to be communicatively connected to the unregistered home appliance that recognized the hidden SSID,
    wherein the Wi-Fi module is configured to receive AP information from the AP, and
    wherein the controller is configured to:
        obtain the AP information, and
        control, based on the Wi-Fi module receiving a registration confirmation key input completion signal from the communicatively-connected unregistered home appliance, the Wi-Fi module to (i) transmit the obtained AP information to the communicatively-connected unregistered home appliance and (ii) transmit the registration confirmation key input completion signal to the server through the AP.

2. The home appliance of claim 1, wherein the controller is configured to control, based on the Wi-Fi module receiving a push signal from the communicatively-connected unregistered home appliance, the Wi-Fi module to transmit the push signal to the server through the AP.

3. The home appliance of claim 1, wherein the controller is configured to control, based on the Wi-Fi module receiving a registration confirmation request for the communicatively-connected unregistered home appliance from the server through the AP, the Wi-Fi module to transmit the registration confirmation request to the communicatively-connected unregistered home appliance.

4. The home appliance of claim 1, wherein the AP information comprises a SSID and a password of the AP.

5. A home appliance configured to be registered in a server, comprising:
   a Wi-Fi module having a virtual interface; and
   a controller configured, based on the home appliance not being registered in a server, to control the Wi-Fi module to search for a registered home appliance transmitting a beacon signal and determine whether a hidden SSID included in the beacon signal of the searched registered home appliance matches a preset hidden SSID stored in a list,
   wherein the controller is configured to:
      control, based on the controller determined that the hidden SSID of the searched registered home appliance matches the preset hidden SSID stored in the list, the Wi-Fi module to attempt communication connection to the searched registered home appliance,
      control, based on the Wi-Fi module being communicatively connected to the searched registered home appliance, the Wi-Fi module to transmit a push signal to the communicatively-connected registered home appliance, and
      control, based on the Wi-Fi module receiving a registration confirmation request from the communicatively-connected registered home appliance and a registration confirmation key input being determined from a user, the Wi-Fi module to transmit a registration confirmation key input completion signal to the registered home appliance.

6. The home appliance of claim 5, wherein the controller is configured to control, based on the Wi-Fi module receiving information regarding AP connected to the registered home appliance from the communicatively-connected registered home appliance after transmitting the registration confirmation key input completion signal to the registered home appliance, the Wi-Fi module to attempt the connection with the AP through the virtual interface based on the received AP information.

7. The home appliance of claim 6, wherein the controller is configured to control, based on successful communication connection between the AP and the Wi-Fi, the Wi-Fi module to transmit, to the server and through the AP, registration information comprising unique information of the home appliance.

8. The home appliance of claim 7,
   wherein the AP information comprises an SSID and a password of the AP, and
   wherein the unique information of the home appliance comprises a serial number of the home appliance.

* * * * *